(12) United States Patent
Matsumoto

(10) Patent No.: US 6,191,965 B1
(45) Date of Patent: Feb. 20, 2001

(54) SWITCHING POWER SUPPLY

(75) Inventor: Akira Matsumoto, Nagano (JP)

(73) Assignee: Nagano Japan Radio Co., Ltd., Nagano (JP)

( * ) Notice: Under 35 U.S.C. 154(b), the term of this patent shall be extended for 0 days.

(21) Appl. No.: 09/585,626

(22) Filed: Jun. 2, 2000

(30) Foreign Application Priority Data

Jul. 7, 1999 (JP) ................................................ 11-192425

(51) Int. Cl.$^7$ .................................................... H02M 7/68
(52) U.S. Cl. ................................ 363/89; 363/21; 363/127
(58) Field of Search ................................ 363/21, 89, 97, 363/127

(56) References Cited

U.S. PATENT DOCUMENTS

| | | | |
|---|---|---|---|
| 3,582,758 | * | 6/1971 | Gunn ..................................... 363/127 |
| 6,104,623 | * | 8/2000 | Rozman ................................. 363/21 |

FOREIGN PATENT DOCUMENTS

| | |
|---|---|
| 8-103073 | 4/1996 (JP) . |
| 9-312972 | 12/1997 (JP) . |
| 11136943 | 5/1999 (JP) . |

* cited by examiner

*Primary Examiner*—Shawn Riley
(74) *Attorney, Agent, or Firm*—Greenblum & Bernstein, P.L.C.

(57) ABSTRACT

A switching power supply is provided which is capable of preventing abnormal operation of a synchronous rectifier circuit thereof, which is caused by a discontinuous current mode, and capable of enhancing an input power factor thereof. A transformer has a primary winding and a secondary winding. A first switching element is connected in series with the primary winding of the transformer, for switching an input voltage. A diode rectifies an induced voltage induced in the secondary winding of the transformer to generate a rectified current. A control signal is generated which has a current value or a voltage value approximately proportional to a current value of the rectified current. A second switching element is connected in parallel with the diode in an equivalent fashion and has a control terminal to which the control signal is input. The second switching element operates in response to the control signal for rectifying the induced voltage. A current is prevented from flowing into the primary winding during an OFF period of the first switching element.

15 Claims, 8 Drawing Sheets

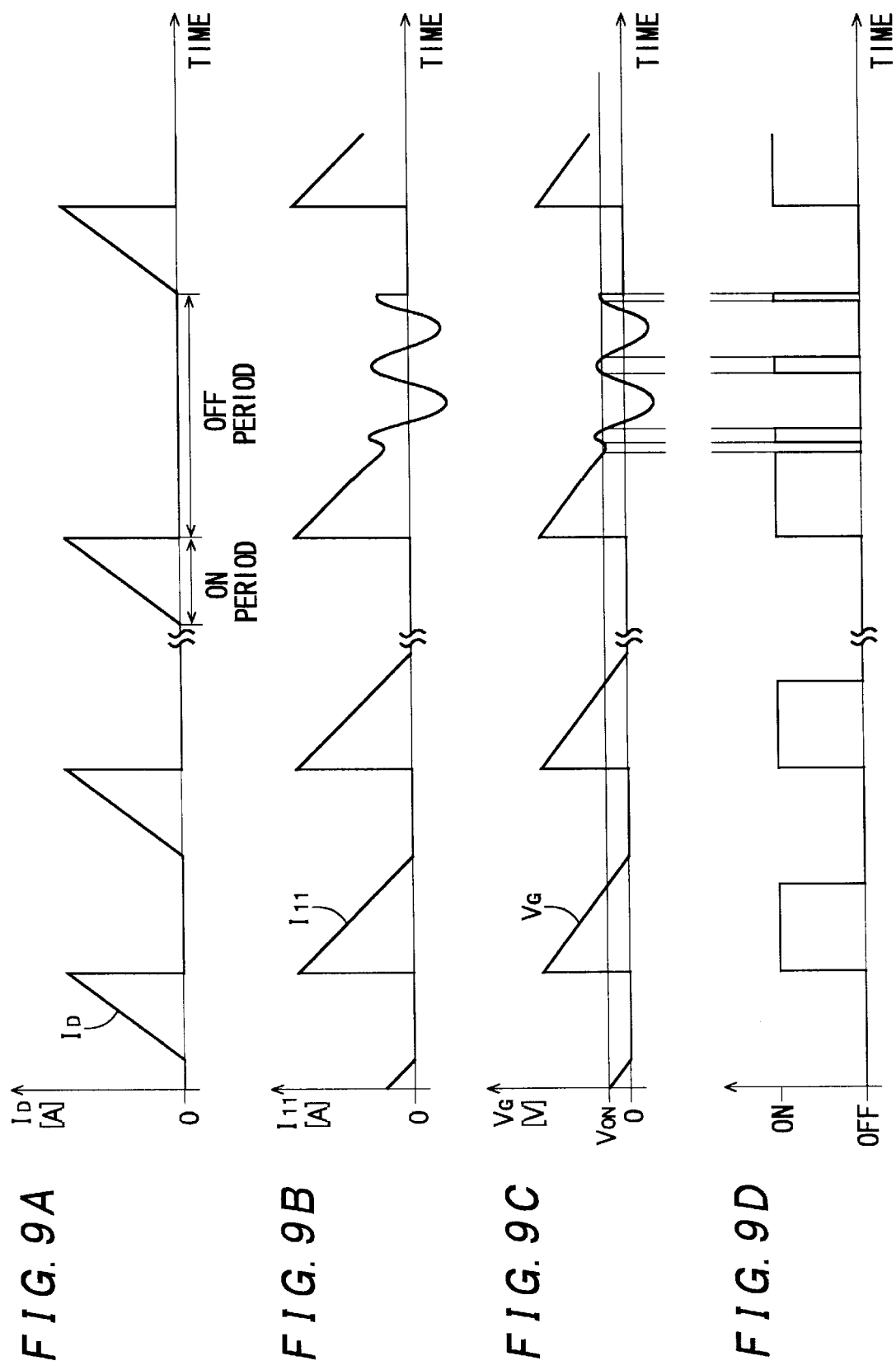

SWITCHING POWER SUPPLY

BACKGROUND OF THE INVENTION

1. Field of the Invention

This invention relates to a switching power supply of a synchronous rectification type for rectifying a voltage induced in a secondary winding of a switching transformer thereof in synchronism with induction of the voltage.

2. Description of the Related Art

Conventional switching power supplies usually employ the diode rectification method of rectifying and smoothing an alternating current output from a secondary winding of a switching transformer thereof by using a diode and a capacitor arranged on the side of the secondary winding. On the other hand, in recent years, a synchronous rectifier circuit using an FET as a rectifying element has been actively developed with a view to reducing power loss caused by the diode during the rectification. A power supply 71 shown in FIG. 8 is an example of the related art, i.e. the switching power supply having a synchronous rectifier circuit of the above-mentioned type.

The power supply 71 is basically a flyback switching power supply including a synchronous rectifier circuit disclosed in Japanese Laid-Open Patent Publication (Kokai) No. 9-312972 filed by the present assignee. More specifically, the power supply 71 includes a switching transformer 2, and a primary circuit (primary winding-side circuit) on the side of a primary winding 2a of the transformer 2, which is comprised of a diode stack 11 for rectifying an alternating current output from an AC power source PS, a smoothing capacitor 12, a MOS field effect switching transistor (hereinafter referred to as "the FET") 14, a resistance 16 of a bias circuit, and a switching control circuit 17 for controlling switching operation of the FET by a frequency control method or a PWM (Pulse Width Modulation) control method. In this primary circuit, a capacitor 15 shown in the figure is implemented by a capacitance between the source and drain of the FET 14, or a capacitor arranged separately from the capacitance of the capacitor 15.

A synchronous rectifier circuit 72 is arranged in a secondary circuit (secondary winding side-circuit) on the side of a secondary winding 2b of the transformer 2. The synchronous rectifier circuit 72 is comprised of a current transformer 21, an FET 22, resistances 23, 24 of a bias circuit, a diode 25, and a smoothing capacitor 26. The current transformer 21 has a primary winding 21a connected in series with an output line for outputting a rectified current to an external load, and a secondary winding 21b having the number of turns n times as large as that of turns of the primary winding 21a (i.e. turn ratio of the secondary winding 21b to the primary winding 21a is equal to n) and serving as a current pickup winding. From the secondary winding 21b, the current transformer 21 outputs a control current $I_{12}$ having a current value which is equal to the current value of a current $I_{11}$ flowing through the primary winding 21a multiplied by the reciprocal (1/n) of the turn ratio n.

The FET 22 includes an inner parasitic diode 27. When an alternating current induced in the secondary winding 2b of the transformer 2 flows in the same direction as that of a voltage $V_{S11}$ indicated in FIG 8, the FET 22 permits positive part of the alternating current to pass therethrough via the inner parasitic diode 27, whereas when the alternating current induced in the secondary winding 2b is directed in the same direction as that of a voltage $V_{S12}$ indicated in FIG. 8, the FET 22 prevents the alternating current from passing therethrough.

In the power supply 71, when an alternating current is output from the AC power source PS, the alternating current is rectified to a pulsating current by the diode stack 11, and the pulsating current is smoothed to a DC current by the capacitor 12. Then, the DC current is switched by the FET 14 under the control of the switching control circuit 17, whereby a current $I_D$ (see a left side portion of FIG. 9A) flows into the primary winding 2a of the transformer 2 to accumulate energy in the transformer 2. Next, when the FET 14 is switched off, the current $I_{11}$ (see a left side portion of FIG. 9B) is caused to be output from the secondary winding 2b by the energy accumulated in the transformer 2. In this case, the current $I_{11}$ flows through a closed loop of the secondary winding 2b of the transformer 2, the primary winding 21a of the current transformer 21, the capacitor 26, and the inner parasitic diode 27, whereby the current $I_{11}$ is smoothed by the capacitor 26. In this state, when the current $I_{11}$ passes through the primary winding 21a, the control current $I_{12}$ is output from the secondary winding 21b to flow into the gate of the FET 22 via the resistance 24 to charge the gate capacitance. After the gate capacitance of the FET 22 is charged, the control current $I_{12}$ flows through a closed loop of the secondary winding 21b and the resistances 24, 23, whereby a voltage $V_G$ (see a left side portion of FIG. 9C) generated across opposite ends of the resistance 23 is applied to the gate of the FET 22.

When the voltage $V_G$ applied to the gate of the FET 22 becomes higher than an ON voltage $V_{ON}$ of the FET 22, the FET 22 is turned on, as shown in a left side portion of FIG. 9D, to permit the current $I_{11}$ to pass between the source and drain of the FET 22. As a result, the alternating current induced in the secondary winding 2b is rectified mainly by using the FET 22. In this case, the rectification causes power loss amounting to a value obtained by multiplying the square of the rectified current by the ON resistance of the FET 22, which is far smaller than power loss which would be suffered by the power supply 71 when it employs the diode rectification method.

Next, when the current $I_{11}$ stops flowing, the control current $I_{12}$ also stops flowing, and accordingly, the voltage $V_G$ applied to the gate of the FET 22 is lowered. In this process, the electric charge accumulated in the gate of the FET 22 is released to the low potential line via the diode 25 and the secondary winding 21b of the current transformer 21, and hence the gate voltage $V_G$ is instantly decreased to 0V, thereby causing the FET 22 to stop its operation in an extremely short turn-off time. As a result, when the current $I_D$ flows through the primary winding 2a next time, the FET 22 is maintained in a completely inoperative state, and in this state, the direction of a current about to flow in the secondary winding 2b and the forward direction of the inner parasitic diode 27 are opposite to each other, so that the current is inhibited from flowing through the secondary winding 2b, thereby reliably preventing the generation of a countercurrent which charges the capacitor 26 in the opposite direction.

As described above, according to the power supply 71, the current transformer 21 generates and outputs the control current $I_{12}$ having a current value approximately proportional to a current value of the current $I_{11}$ rectified by the inner parasitic diode 27, to thereby make the FET 22 operative. This enables an increased rectifying efficiency to be achieved in comparison with the diode rectification method.

However, the switching power supply 71 has room for improvement as to the following points: It is true that no particular inconveniences occur when the switching control circuit 17 controls the switching operation of the FET 14 by the frequency control method, but when the switching operation of the FET 14 is controlled by the PWM control method, as shown in a right side portion of FIG. 9A, the transformer 2 sometimes completes release of the accumulated energy before the FET 14 is turned on next time. In such a case, there occurs a so-called discontinuous current mode in which the current $I_{11}$ flowing through the secondary winding 2b and a current flowing through the primary winding 2a becomes discontinuous. At this time, the capacitor 15 on the primary circuit side has been charged during the ON period of the FET 14 to a voltage $V_{C15}$ represented by the following equation:

$$V_{C15}=V_{C12}+V_O \cdot N_1/N_2$$

wherein, $V_{C12}$, $V_O$, $N_1$ and $N_2$ represent a voltage across opposite ends of the capacitor 12, the voltage value of the output voltage $V_O$, the number of turns of the primary winding 2a, and the number of turns of the secondary winding 2b, respectively.

This causes a phenomenon of resonance. That is, the charged energy causes a current $I_{13}$ to flow through a current path of the capacitor 15, the primary winding 2a of the transformer 2, and the capacitor 12, and inversely when the voltage across the opposite ends of the capacitor 15 becomes lower than the voltage across the opposite ends of the capacitor 12, a current directed in an opposite direction to the direction of flow of the current $I_{13}$ flows through the same current path. In such a case, since the current $I_{11}$ flows through the secondary winding 2b, the current $I_{12}$ also flows through the secondary winding 21b of the current transformer 21. Accordingly, as shown in a right side portion of FIG. 9C, the voltage $V_G$ applied to the gate of the FET 22 becomes higher than the ON voltage $V_{ON}$, so that, as shown in a right side portion of FIG. 9D, an abnormal operation of the synchronous rectifier circuit can be caused in which when the FET 22 should be controlled to an OFF state, it is intermittently turned on. In such a case, as shown in FIGS. 9A and 9D, when the FET 22 is in the ON state, if the FET 14 is simultaneously turned on, the voltage $V_{S12}$ induced in the secondary winding 2b is short-circuited via the FET 22, the capacitor 26, and the primary winding 21a of the current transformer 21, which causes a large current to momentarily flow in a direction opposite to a normal direction. This can result in breakage of the FET 22 or an input fuse or a great deal of switching loss due to the large current flowing through the FET 22. To eliminate this inconvenience, the power supply 71 is demanded to be free from such an abnormal operation of the synchronous rectifier circuit.

Further, the power supply 71 uses the primary circuit of a so-called capacitor input type. Hence, an input current flows into the capacitor 12 in the form of pulses, which generates so-called input current harmonics. Therefore, when the power supply 71 has a large rated power, or when a plurality of power supplies 71 are put into operation at the same time, the harmful harmonic components of the input current leak to a commercial electric system, thereby causing the problems of harmonic interference or heating of electric power apparatus due to voltage distortion. To eliminate these inconveniences, the power supply 71 is demanded to have an improved power factor.

SUMMARY OF THE INVENTION

It is a primary object of the invention to provide a switching power supply which is capable of preventing abnormal operation of a synchronous rectifier circuit thereof, which is caused by a discontinuous current mode, and it is another object of the invention to provide a switching power supply which is capable of enhancing an input power factor thereof.

To attain the above object, the invention provides a switching power supply comprising:

a transformer having a primary winding and a secondary winding;

a first switching element connected in series with the primary winding of the transformer, for switching an input voltage;

a diode for rectifying an induced voltage induced in the secondary winding of the transformer to generate a rectified current;

control signal-generating means for generating a control signal having a current value or a voltage value approximately proportional to a current value of the rectified current;

a second switching element connected in parallel with the diode in an equivalent fashion and having a control terminal to which the control signal is input, the second switching element operating in response to the control signal, for rectifying the induced voltage; and current-limiting means for preventing flow of a current into the primary winding during an OFF period of the first switching element.

According to this switching power supply, current-limiting means for preventing flow of a current into the primary winding during an OFF period of the switching element is included, whereby it is possible to positively prevent an abnormal operation of a synchronous rectifier circuit due to a discontinuous current mode. This makes it possible to eliminate inconveniences caused by a short-circuit of voltage induced in the secondary winding via a smoothing capacitor of a secondary winding-side circuit The second switching element is implemented e.g. by a field effect transistor or an ordinary transistor.

Preferably, the primary winding of the transformer comprises a first primary winding and a second primary winding, with a pulsating voltage as the input voltage being switched when the pulsating voltage is equal to or higher than a predetermined voltage, to thereby induce the induced voltage in the secondary winding via the first primary winding, and a smoothed DC voltage as the input voltage being switched when the pulsating voltage is lower than the predetermined voltage, to thereby induce the induced voltage in the secondary winding via the second primary winding.

According to this preferred embodiment, a pulsating voltage as the input voltage is switched when the pulsating voltage is equal to or higher than a predetermined voltage, to thereby induce the induced voltage in the secondary winding via the first primary winding of the transformer, and a smoothed DC voltage as the input voltage is switched when the pulsating voltage is lower than the predetermined voltage, to thereby induce the induced voltage in the secondary winding via the second primary winding of the transformer. This makes it possible to markedly improve the input power factor, and at the same time, reduce the size and manufacturing costs of the switching power supply.

Preferably, the second switching element is formed by a field effect transistor, and the diode is an inner parasitic diode of the field effect transistor.

According to this preferred embodiment, the inner parasitic diode of a field effect transistor rectifies the induced voltage in the secondary winding. This makes it possible to construct the switching power supply with ease.

Preferably, the current-limiting means is a diode connected in series with the primary winding.

According to this preferred embodiment, the current-limiting means is formed by a diode connected in series with the primary winding. Therefore, it is possible to reliably prevent flow of a current into the primary winding during the OFF period of the first switching element, and further it is possible to construct the switching power supply with ease.

Preferably, the switching power supply includes a low potential line, and electric charge release means connected between the control terminal of the second switching element and the low potential line, for releasing an electric charge accumulated in the control terminal when output of the control signal is stopped. In this case, a gate in the field effect transistor or a base in the ordinary transistor correspond to the control terminal.

According to this preferred embodiment, the electric charge release means releases an electric charge accumulated in the control terminal when output of the control signal is stopped. Therefore, the turn-off time required for turning off the second switching element can be shortened. As a result, it is possible to positively prevent generation of a countercurrent in the secondary winding-side circuit.

Preferably, the switching power includes an output line for outputting the rectified current, and the control signal-generating means is one of a current transformer and a single-winding transformer each including an input winding inserted in an intermediate portion of the output line and an output winding capable of outputting the control signal having the current value or the voltage value approximately proportional to the current value of the rectified current flowing through the input winding.

According to this preferred embodiment, the control signal-generating means is formed by a current transformer or a single-winding transformer. Therefore, it is possible to construct the switching power supply with ease.

Preferably, the switching power supply includes current amplifier means for amplifying a current of the control signal and outputting the amplified current of the control signal to the control terminal of the second switching element.

According to this preferred embodiment, the control signal amplified by the current amplifier means is output to the control terminal of the second switching element, whereby the turn-on time required for turning on the second switching element can be extremely reduced, resulting in an enhanced rectifying efficiency.

Preferably, the switching power supply includes control signal output control means for stopping output of the control signal to the second switching element when a voltage generated by the control signal-generating means is lower than a predetermined value.

According to this preferred embodiment, the control signal output control means stops operation of the second switching element before output of the control signal is stopped, whereby generation of a countercurrent in the secondary winding-side circuit can be positively prevented.

Preferably, the control signal output control means is a Zener diode connected between the control signal-generating means and the control terminal of the second switching element.

According to this preferred embodiment, the control signal output control means can be easily constructed by the Zener diode.

BRIEF DESCRIPTION OF THE DRAWINGS

These and other objects and features of the present invention will be explained in more detail below with reference to the attached drawings, wherein:

FIG. 4A is a waveform diagram showing a waveform of an AC voltage $V_{AC}$, which is useful in explaining operation of the power supply 1a;

FIG. 4B is a waveform diagram showing a waveform of a pulsating voltage $V_P$, which is useful in explaining the operation of the power supply 1a;

FIG. 4C is a waveform diagram showing a waveform of a current $I_1$, which is useful in explaining the operation of the power supply 1a;

FIG. 4D is a waveform diagram showing a waveform of a current $I_2$, which is useful in explaining the operation of the power supply 1a;

FIG. 4E is a waveform diagram showing a waveform of an input current $I_{2IN}$, which is useful in explaining the operation of the power supply 1a;

FIG. 4F is a waveform diagram showing a waveform of an input current $I_{IN}$, which is useful in explaining the operation of the power supply 1a;

FIG. 9A is a waveform diagram showing a waveform of a current $I_D$ flowing through a primary winding 2a of a transformer 2, which is useful in explaining operation of the power supply 71;

FIG. 9B is a waveform diagram showing a waveform of a current $I_{11}$ flowing through a secondary winding 2b of the transformer 2, which is useful in explaining the operation of the power supply 71;

FIG. 9C is a waveform diagram showing a waveform of a voltage $V_G$ applied to the gate of an FET 22, which is useful in explaining the operation of the power supply 71; and FIG. 9D is a diagram showing operating states of the FET 22, which is useful in explaining the operation of the power supply 71.

DESCRIPTION OF PREFERRED EMBODIMENTS

The invention will now be described in detail with reference to drawings showing embodiments thereof. In these embodiments, a switching power supply according to the invention is applied to a flyback-type switching power supply (hereinafter simply referred to as "the power supply"). In the following description of embodiments of the invention, component parts and elements similar to those of the power supply 71 of the related art described hereinbefore, as well as voltages and currents appearing at portions of the power supply corresponding to ones of the power supply 71 are designated by identical symbols, and detailed description thereof is omitted.

Figure 1:
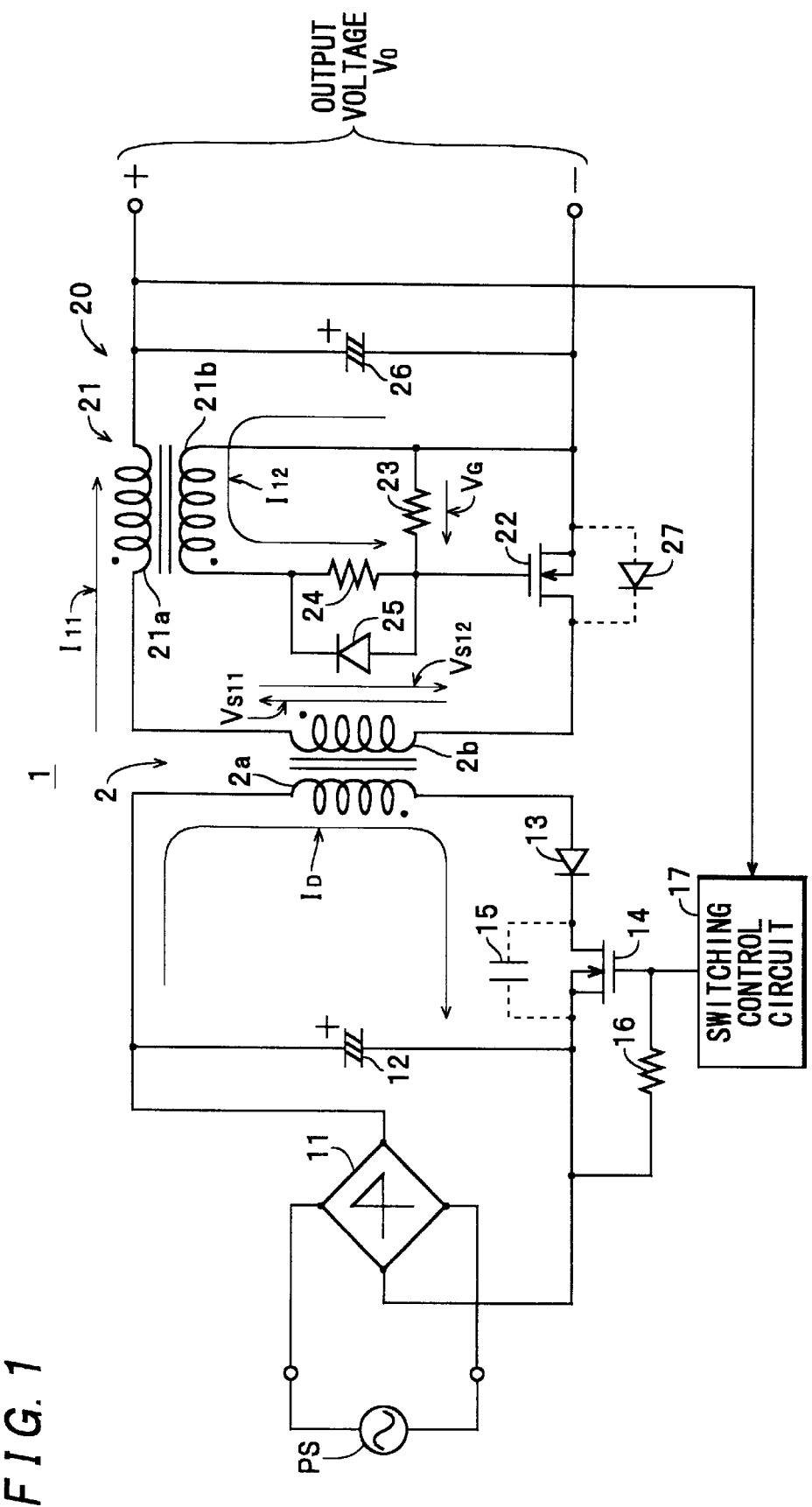
FIG. 1 is a circuit diagram of a power supply 1 according to an embodiment of the invention.

Referring first to FIG. 1, there is shown the power supply 1 including a primary circuit i.e. the primary winding-side circuit of a transformer 2, which is comprised of a diode stack 11 for rectifying an alternating current output from an AC power source PS, a smoothing capacitor 12, a diode 13 corresponding to current-limiting means of the invention, an FET 14 corresponding to a first switching element of the invention, a switching control circuit 17, and a resistance 16.

Further, the power supply 1 includes a synchronous rectifier circuit 20 as a secondary circuit i.e. the secondary winding-side circuit of the transformer 2. The synchronous rectifier circuit 20 is comprised of a current transformer (control signal-generating means) 21, an FET (second switching element) 22, resistances 23, 24, a diode 25, and a capacitor 26. The resistance 23 serves as a terminating resistor on the side of the secondary winding 21b of the current transformer 21, and at the same time as a current-voltage converter for converting a control signal $I_{12}$ output from the current transformer 21 into a voltage signal. Further, the resistance 23 also serves as electric charge-releasing means for releasing an electric charge accumulated in the gate of the FET 22 to a low potential line, when output of the control current $I_{12}$ is stopped. The resistance 24 is used for limiting the control current $I_{12}$ when the control current $I_{12}$ is supplied. The diode 25 serves as electric charge-releasing means for releasing the electric charge accumulated in the gate of the FET 22 to the low potential line via the secondary winding 21b of the current transformer 21, when the output of the control current 12 is stopped.

Next, the operation of the power supply 1 will be described with reference to FIGS. 2A to 2D.

As shown on a left side portion of each of these figures, this power supply 1 basically operates in the same manner as the power supply 71, when it is in a continuous current mode in which a current $I_D$ flowing through the primary winding 2a of the transformer 2 and a current $I_{11}$ flowing through the secondary winding 2b of the transformer 2 are continuous with each other. If the switching operation of the FET 14 is controlled only by employing the PWM (Pulse-Width Modulation) control method or by employing the same in combination with the frequency control method, as shown in a right side portion of FIGS. 2A to 2D, the power supply 1 can be in a discontinuous current mode in which the current $I_D$ and the current $I_{11}$ are discontinuous from each other. In such a case, when the FET 14 is turned off to stop the flow of the current $I_D$, energy accumulated in the transformer 2 causes the current $I_{11}$ to be output from the secondary winding 2b of the transformer 2 (see a right side portion of FIG. 2B). This current $I_{11}$ flows through a closed loop of the secondary winding 2b of the transformer 2, the primary winding 21a of the current transformer 21, the capacitor 26, and an inner parasitic diode 27 of the FET 22, whereby the current $I_{11}$ is smoothed by the capacitor 26 to generate an output voltage $V_O$. In this state, the control current $I_{12}$ output from the secondary winding 21b flows into the gate of the FET 22 via the resistance 24, and charges a gate capacitance of the FET 22, while a voltage $V_G$ generated across opposite ends of the resistance 23 (see a right side portion of FIG. 2C) is applied to the gate of the FET 22.

Figure 2:
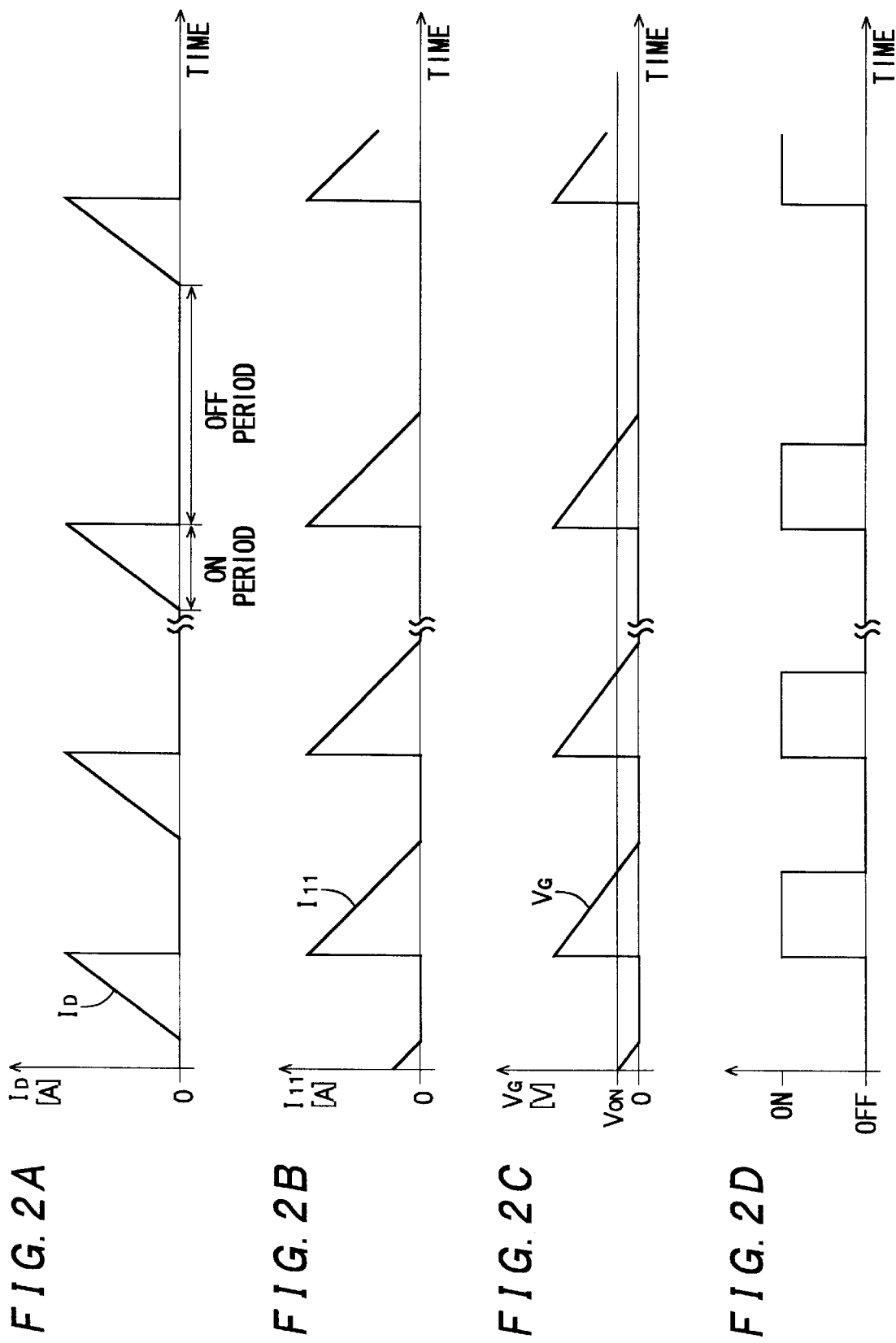
FIG. 2A is a waveform diagram showing a waveform of a current $I_D$ flowing through a primary winding 2a of a transformer 2, which is useful in explaining operation of the power supply 1.
FIG. 2B is a waveform diagram showing a waveform of a current $I_{11}$ flowing through a secondary winding 2b of the transformer 2, which is useful in explaining the operation of the power supply 1.
FIG. 2C is a waveform diagram showing a waveform of a voltage $V_G$ applied to the gate of an FET 22, which is useful in explaining the operation of the power supply 1.
FIG. 2D is a diagram showing operating states of the FET 22, which is useful in explaining the operation of the power supply 1.

When the voltage $V_G$ applied to the gate becomes higher than an ON voltage $V_{ON}$ of the FET 22, the FET 22 is turned on as shown in a right side portion of FIG. 2D, to permit the current $I_{11}$ to pass between the source and drain thereof. As a result, the alternating current induced in the secondary winding 2b is rectified mainly by the FET 22, whereby similarly to the power supply 71, the power loss is made far smaller than power loss caused by the diode rectification method.

Next, when the current $I_{11}$ stops flowing, the control current $I_{12}$ also stops flowing, so that the voltage $V_G$ applied to the gate of the FET 22 is lowered. In this case, the electric charge accumulated in the gate of the FET 22 is released to the low potential line via the diode 25 and the secondary winding 21b of the current transformer 21, and hence the gate voltage $V_G$ is instantly lowered to 0V, thereby causing the FET 22 to stop its operation in an extremely short turn-off time. This makes it possible to reliably prevent generation of a countercurrent which charges the capacitor 26 in an opposite direction, when the current $I_D$ flows through the primary winding 2a next time.

When the transformer 2 almost completes the release of energy accumulated therein, the current $I_{11}$ stops flowing, and energy accumulated in a capacitor 15 connected in parallel with the FET 14 in an equivalent fashion (i.e. as a capacitor equivalent to the capacitance between the drain and source of the FET 14) is ready to cause resonance on the side of the primary circuit to start. In the power supply 1, however, the diode 13 is arranged in a current path extending from one end of the capacitor 15, through the primary winding 2a of the transformer 2 and the capacitor 12, to the other end of the capacitor 15, such that a current about to flow in this direction of the mentioned order of the devices along the current path is blocked. Consequently, the diode 13 prevents the energy accumulated in the capacitor 15 from causing the current to flow from the capacitor 15, so that the resonance is prevented from occurring in the primary circuit. As a result, as shown in a right side portion of FIG. 2B, the current $I_{11}$ is prevented from flowing in the secondary circuit, which causes the voltage $V_G$ applied to the gate of the FET 22 to be maintained approximately at 0V, thereby preventing an abnormal operation of the synchronous rectifier circuit 20.

As described hereinabove, according to the power supply 1 of the first embodiment, the current transformer 21 generates and outputs the control current $I_{12}$ having a current value approximately proportional to the current value of the current $I_{11}$ rectified by the inner parasitic diode 27 of the FET 22, to thereby make the FET 22 operative. This makes it possible to achieve a rectification efficiency higher than one achieved by the diode rectification method. Further, during an OFF period (non-conduction period) of the FET 14, the diode 13 limits or blocks the flow of a current to be caused by energy accumulated in the capacitor 15, and hence it is possible to positively prevent an abnormal operation of the synchronous rectifier circuit 20 due to the discontinuous current mode. This makes it possible to eliminate inconveniences caused by a short-circuit of the voltage $V_{S12}$ induced in the secondary winding 2b, which would otherwise occur via the capacitor 26.

Next, a power supply 1a according to another embodiment will be described with reference to FIG. 3. It should be noted that component parts and elements similar to those of the power supply 1 are designated by identical reference numerals, and redundant description thereof is omitted.

Figure 3:
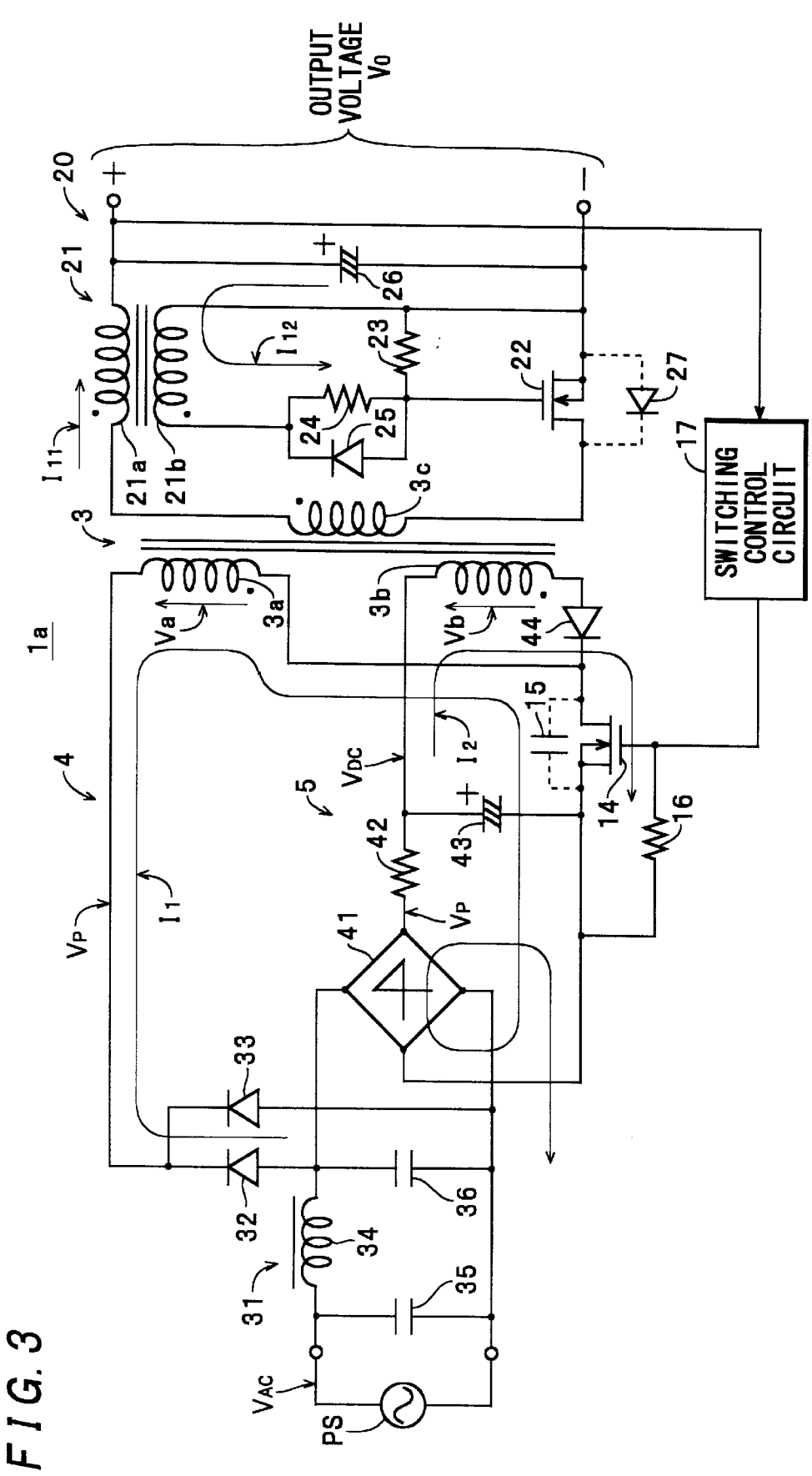
FIG. 3 is a circuit diagram of a power supply 1a according to another embodiment of the invention.

As shown in FIG. 3, the power supply 1a is a flyback-type AC-DC converter, and includes a transformer 3. The power supply 1a has a primary circuit on the side of a primary windings 3a, 3b of the transformer 3, and a secondary circuit on the side of a secondary winding 3c of the transformer 3. The primary circuit is comprised of a π-type noise filter 31 having two capacitors 35, 36 and a choke coil 34, a boost (step-up)/buck (step-down) converter 4 for improving a power factor, and a boost/buck converter 5 of a capacitor input type. The secondary circuit is comprised of a synchronous rectifier circuit 20. In this embodiment, the boost/buck converter 4 is comprised of diodes (corresponding to current-limiting means of the invention) 32, 33 for rectifying an AC voltage $V_{AC}$ output from an AC power source PS, to a pulsating voltage $V_P$ of a pulsating current, the Transformer 3, an FET 14,and a resistance 16. The boost/buck converter circuit 5 is comprised of a diode stack 41 for smoothing the AC voltage $V_{AC}$ to a DC voltage $V_{DC}$, a current-limiting resistance 42, a smoothing capacitor 43, the transformer 3, a diode 44 corresponding to current-limiting means of the invention, the FET 14, and the resistance 16. That is, the FET 14 is shared by the boost/buck converters 4, 5. It is also possible to employ a current-limiting element, such as a power thermistor or the like, in place of the current-limiting resistance 42.

Further, the primary windings 3a, 3b and the secondary winding 3c of the transformer 3 are magnetically coupled to each other by a magnetic core, with a ratio (turn ratio R) of the number Nb of turns of the primary winding 3b to the number Na of turns of the primary winding 3a being set to 2:1, for instance.

In the power supply 1a, when the AC power source PS is turned on, the diode stack 41 generates the DC voltage $V_{DC}$ approximately equal to the maximum voltage $V_{MAX}$ of the pulsating voltage $V_P$ by rectifying the AC voltage $V_{AC}$ to the pulsating voltage $V_P$, and supplies the DC voltage $V_{DC}$ to the capacitor 43 via the resistance 42. In this process, the resistance 42 prevents the occurrence of an input inrush current by limiting the amount of a current flowing into the capacitor 23 to a predetermined value.

Figure 4A:
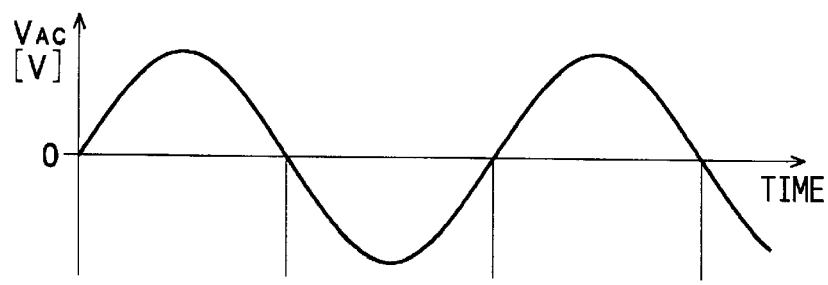
Figure 4B:
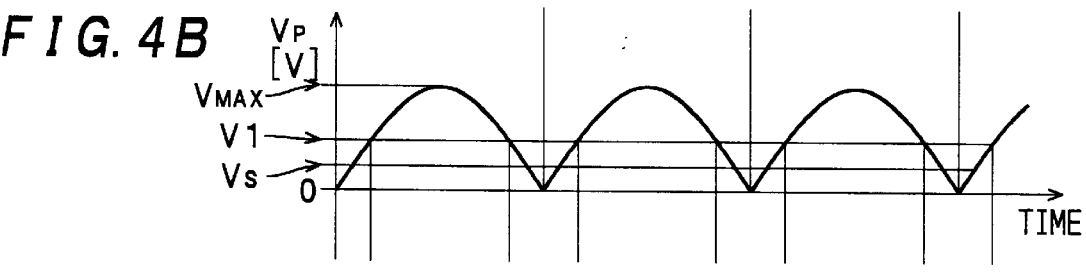

On the other hand, when the switching operation of the FET 14 is started, the diodes 32, 33 rectify the AC voltage $V_{AC}$ shown in FIG. 4A to generate the pulsating voltage $V_P$ of the pulsating current shown in FIG. 4B. During a high-voltage time period in which the pulsating voltage $V_P$ is equal to or higher than a predetermined voltage V1, the boost/buck converter 4 generates an output voltage $V_O$. More specifically, during this time period, when the FET 14 is turned on, the current $I_1$ flows through a current path of the diode 32, the primary winding 3a, the FET 14, and the diode stack 41. Accordingly, as shown in FIG. 3, a voltage Va is induced across opposite ends of the primary winding 3a, and in accordance with this induction, a voltage Vb dependent on the turn ratio R is induced across opposite ends of the primary winding 3b. In this case, during the high-voltage time period in which the pulsating voltage $V_P$ is equal to or higher than the predetermined voltage V1 (see FIG. 4B) which is one half of the maximum voltage $V_{MAX}$, the induced voltage Vb is equal to or higher than the maximum voltage $V_{MAX}$ of the pulsating voltage $V_P$. Consequently, during this time period, the voltage Vb is equal to or higher than the DC voltage $V_{DC}$, so that a current $I_2$ (see FIG. 3) to be caused by the DC voltage $V_{DC}$ is prevented from flowing into the primary winding 3b, and at the same time the diode 44 prevents a current from flowing in the opposite direction to the direction of flow of the current $I_2$ into the capacitor 43. This makes it possible to prevent occurrence of power loss caused by the current $I_2$ flowing through the primary winding 3b, and a sharp rise in the terminal voltage of the capacitor 43. Next, when the FET 14 is turned off, the synchronous rectifier circuit 20 rectifies and smoothes an alternating current (at an induced voltage) induced in the secondary winding 3c to thereby generate the output voltage $V_O$. In this process as well, the diodes 32, 33 block a current in the opposite direction to the flow of the current $I_1$, which is to be caused by the energy accumulated in the capacitor 15, from flowing into the primary winding 3a, and the diode 44 blocks a current to be caused by the energy accumulated in the capacitor 15 from flowing in the opposite direction to the flow of the current $I_2$ into the primary winding 3b, whereby a resonance is prevented from occurring in the primary circuit.

Then, the pulsating voltage $V_P$ is progressively decreased, and during a low-voltage time period in which the pulsating voltage $V_P$ is lower than the predetermined voltage V1, the boost/buck converter circuit 5 generates the output voltage $V_O$. More specifically, during this time period, when the FET 14 is turned on, the current $I_2$ caused by the energy accumulated in the capacitor 43 flows through a current path of the primary winding 3b, the diode 44, and the FET 14. In this process, as shown in FIG. 3, the voltage Vb is induced across opposite ends of the primary winding 3b, and in accordance with this induction, the voltage Va dependent on the turn ratio R is induced across opposite ends of the primary winding 3a. In this case, during this time period, the voltage Va is equal to one half of the DC voltage $V_{DC}$, and hence the voltage Va is higher than the pulsating voltage $V_P$. Accordingly, during this time period, the current $I_1$ dependent on the pulsating voltage $V_P$ is prevented from flowing into the primary winding 3a, and at the same time the diodes 32, 33 block a current from flowing in the opposite direction to the direction of flow of the current $I_1$ into the primary winding 3a. Next, when the FET 14 is turned on, the synchronous rectifier circuit 20 rectifies and smoothes the induced voltage induced in the secondary winding 3c to thereby generate the output voltage $V_O$. In this case as well, the diodes 32, 33 block a current to be caused by the energy accumulated in the capacitor 15 from flowing in the opposite direction to the direction of flow of the current $I_1$ into the primary winding 3a, and the diode 44 blocks a current to be caused by the energy accumulated in the capacitor 15 from flowing in the opposite direction to the direction of the flow of the current $I_2$ into the primary winding 3b, whereby a resonance is prevented from occurring in the primary circuit.

Figure 4C:
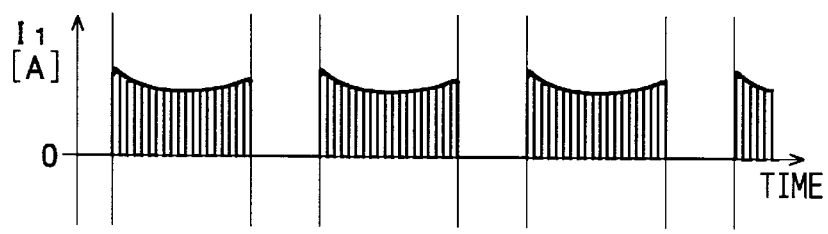
Figure 4D:
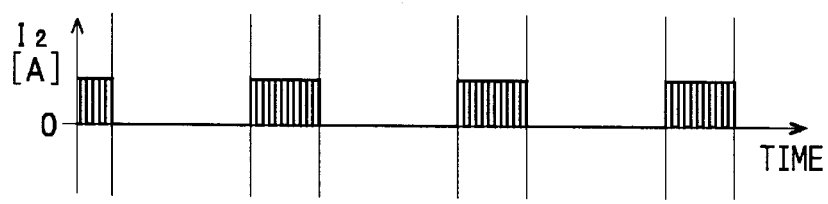
Figure 4E:
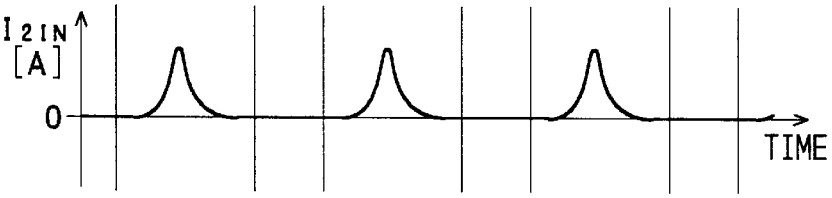
Figure 4F:
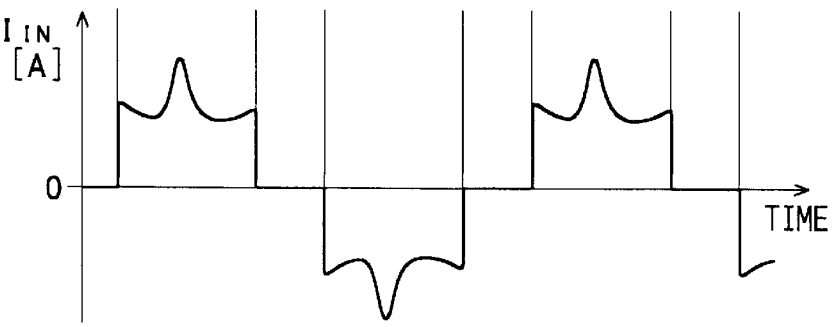

By the operations described above, as shown in FIGS. 4C and 4D, during the high-voltage time period in which the pulsating voltage $V_P$ is equal to or higher than the predetermined voltage V1, the output voltage $V_O$ is generated by the current $I_1$ flowing through the primary winding 3a, while during the low-voltage time period in which the pulsating voltage $V_P$ is lower than the predetermined voltage V1, the output voltage $V_P$ is generated by the current $I_2$ flowing through the primary winding 3b. On the other hand, an input current $I_{2IN}$ shown in FIG. 4E flows into the capacitor 43 in the form of a pulse when the pulsating voltage $V_P$ is close to the maximum voltage $V_{MAX}$ thereof. Accordingly, an input current $I_{IN}$ flowing into the power supply 1a is a combined current of the current $I_1$ shown in FIG. 4C and the input current $I_{2IN}$ shown in FIG. 4E, which has a waveform shown in FIG. 4F. Consequently, the current $I_{IN}$ flows into the power supply 1a over approximately the whole cycle of the AC voltage $V_{AC}$, which provides the advantageous effect of improved input power factor of approximately 0.85 to 0.9. It should be noted that the noise filter 31 can eliminate switching noises in the normal mode, generated by the ON-OFF operations of the FET 14, thereby positively preventing switching noises from leaking to the commercial line.

As described above, according to the power supply 1a, it is possible to enhance the input power factor as well as prevent occurrence of a resonance on the side of the primary circuit, so that an abnormal operation of the synchronous rectifier circuit 20 can be prevented. Further, within each half cycle of the AC voltage $V_{AC}$, during a time period over which the AC voltage $V_{AC}$ is equal to or closer to the peak voltage (that is, during a high-voltage time period of the pulsating voltage $V_P$), energy is transmitted to the secondary winding 3c side via the primary winding 3a, and during time periods over which the AC voltage $V_{AC}$ is closer to 0V (that is, during low-voltage time periods of the pulsating voltage $V_P$), energy is transmitted to the secondary winding 3c side via the primary winding 3b, whereby one transformer 3 can be shared by the two the boost/buck converters 4, 5. In this case, the number of the windings 3a, 3b and 3c can be reduced only by one compared with a case in which transformers are arranged for the respective boost/buck converters 4, 5. In general, the ratio of volume of the magnetic core to the whole volume of the transformer is very large, and hence by reducing the number of (two) magnetic cores to one, the ratio of the volume of the transformer to the whole volume of the switching power supply can be reduced to approximately ½. As a result, it is possible to reduce the size and manufacturing costs of the power supply 1a.

Next, a power supply 1b according to another embodiment will be described with reference to FIG. 5. It should be noted that in the figure, a synchronous rectifier circuit 50 is mainly shown in place of the synchronous rectifier circuit 20 of the power supply 1, and that component parts and elements similar to those of the power supply 1 are designated by identical reference numerals, and redundant description thereof is omitted.

Figure 5:
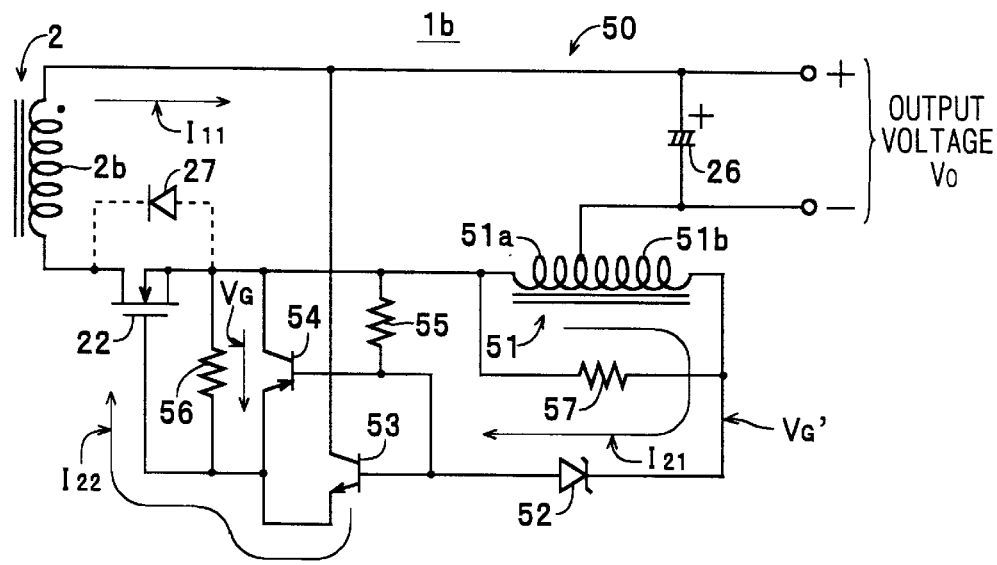
FIG. 5 is a circuit diagram of a power supply 1b according to another embodiment of the invention.

As shown in FIG. 5, the synchronous rectifier circuit 50 includes an autotransformer 51 which has a primary winding 51a thereof connected between the negative terminal of a capacitor 26 and the source of an FET 22, and a secondary winding 51b having an end, which is remote from the primary winding 51a, connected to the cathode of a Zener diode (control signal output control means) 52. The autotransformer 51 is a single-winding transformer constructed such that the primary winding 51a and the secondary winding 51b having the number of turns n times as large as that of turns of the primary winding 51a (i.e. a turn ratio between the number of turns of the secondary winding 51b and that of turns of the primary winding 51a is n:1) are not isolated or insulated from each other, and at the same time the winding portion of the primary winding 51a is part of the secondary winding 51b. Further, in the autotransformer 51, a control current $I_{21}$ having a current value which is equal to a current $I_{11}$ flowing through the primary winding 51a multiplied by the reciprocal (1/n) of the turn ratio n is output from the secondary winding 51b. The autotransformer 51 is arranged together with the FET 22 on the side of the low potential line of the secondary winding 2b of the transformer 2, so that there is no need to insulate the primary winding 51a and the secondary winding 51b from each other, which makes it possible to make shared use of part of the primary winding 51a, thereby reinforcing the combination of the windings 51a and 51b.

Further, the synchronous rectifier circuit 50 includes an npn transistor (current amplifier means) 53 whose base is connected to the anode of the Zener diode 52, a pnp transistor (electric charge release means) 54 whose emitter is connected to the emitter of the transistor 53, and resistances 55 to 57.

The transistor 53 amplifies the control current $I_{21}$ output from the secondary winding 51b of the autotransformer 51 and outputs the amplified current to the gate of the FET 22 as a new control current $I_{22}$. In this embodiment, since an output voltage $V_O$ is applied to the collector of the transistor 53, when the transistor 53 is in operation, it can apply a voltage having a voltage value (approximately equal to the voltage value of the output voltage $V_O$) higher than that of an ON voltage (approximately 5V) between the source and gate of the FET 22. This makes it possible to cause the FET 22 to completely operate in a saturation region, which permits a voltage between the source and drain of the FET 22 to be decreased, thereby reducing power loss by the FET 22.

The transistor 54 serves as electric charge release means for releasing an electric charge accumulated in the gate of the FET 22 to the low potential line. More specifically, when the transistor 53 stops the output of the control current $I_{22}$, the transistor 54 starts to operate by permitting a base current caused by the electric charge accumulated in the gate of the FET 22 to flow to the low potential line via the resistance 55. When the transistor 54 is in operation, it releases the electric charge accumulated in the gate of the FET 22 to the low potential line via the emitter and the collector thereof, to thereby shorten the turn-off time of the FET 22.

Figure 6A:
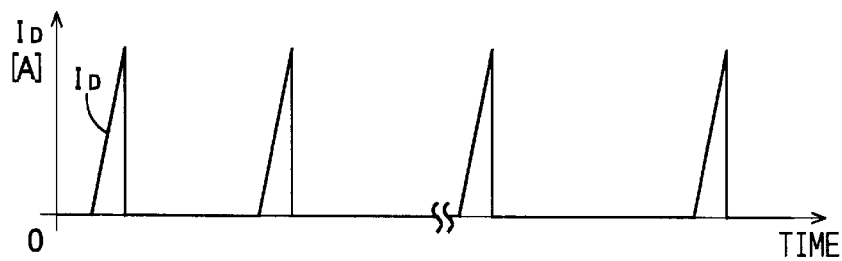
FIG. 6A is a waveform diagram showing a waveform of a current $I_D$ flowing through a primary winding 2a of a transformer 2, which is useful in explaining operation of the power supply 1b.

Next, the operation of the power supply 1b will be described with reference to FIG. 6. It should be noted that redundant description of the same operations as described above as to the power supply 1 is omitted.

When the FET 14 is switched on, a current $I_D$ (see a left side portion of FIG. 6A) flows through the primary winding 2a of the transformer 2, whereby energy is accumulated in the transformer 2. Then, when the FET 14 is switched off, the current $I_{11}$ is output from the secondary winding 2b. In this case, since the current $I_{11}$ flows in a direction indicated in FIG. 5, it flows through a closed loop of the primary winding 51a of the autotransformer 51, the inner parasitic diode 27 of the FET 22, the secondary winding 2b of the transformer 2, and the capacitor 26, whereby the current $I_{11}$ is smoothed by the capacitor 26. In this state, when the current $I_{11}$ passes through the primary winding 51a, the control current $I_{21}$ is output from the secondary winding 51b. This control current $I_{21}$ is input to the base of the transistor 53 via the Zener diode 52, and amplified by the transistor 53 into the control current $I_{22}$, which flows into the gate of the FET 22 to charge the gate capacitance, thereby causing the FET 22 to operate.

On the other hand, after the gate capacitance is charged, the control current $I_{22}$ flows to the low potential line via a resistance 56, so that a voltage $V_G$ generated across opposite ends of the resistance 56 is applied to the gate of the FET 22 as a gate voltage, to thereby maintain the FET 22 in the ON state. As a result, a voltage induced across the secondary winding 2b is rectified by the FET 22. Further, in this case, the control current $I_{21}$ flows through a closed loop of the secondary winding 51b, the Zener diode 52, the resistance 55, the inner parasitic diode 27, the secondary winding 2b of the transformer 2, and the capacitor 26, whereby the transistor 54 is maintained in the off state, by a voltage generated across opposite ends of the resistance 55.

Next, when the current $I_{11}$ stops flowing, the control current $I_{21}$ also stops flowing, so that the transistor 53 stops its operation, whereby the voltage $V_G$ ceases to be applied to the gate of the FET 22. In this case, the voltage across the opposite ends of the resistance 55 is lowered, and the electric charge accumulated in the gate of the FET 22 is released as a base current of the transistor 54, which flows through the emitter and base of the transistor 54, and then through the resistance 55 to the low potential line. Consequently, the operation of transistor 54 permits the electric charge accumulated in the gate of the FET 22 to be released via the emitter and collector of the transistor 54 to the low potential line. Further, the electric charge accumulated in the gate of the FET 22 is also released to the low potential line via the resistance 56. This permits the gate voltage $V_G$ to be instantly decreased to 0V, thereby enabling the FET 22 to stop its operation in a very short turn-off time.

Figure 6B:
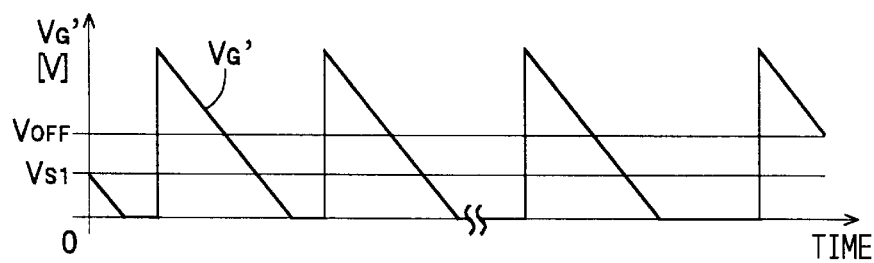
FIG. 6B is a waveform diagram showing a waveform of a voltage $V_G$ output from a secondary winding 51 of an autotransformer 51, which is useful in explaining the operation of the power supply 1b.
Figure 6C:
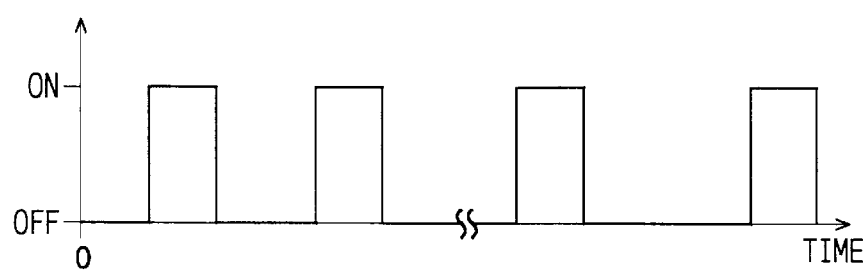
FIG. 6C is a diagram showing operating states of the FET 22, which is useful in explaining the operation of the power supply 1b.

Further, a voltage $V_G$ applied to the gate of the FET 22 is dropped from a voltage $V_G'$ output from the secondary winding 51b of the autotransformer 51 by the Zener voltage of the diode 52. Hence, the voltage at the base of the transistor 53 becomes equal to 0V when the voltage $V_G'$ is equal to or lower than the Zener voltage. Consequently, as shown in FIG. 6B, the FET 22 is turned off when the voltage $V_G'$ becomes equal to a voltage $V_{OFF}$ which is higher than a threshold voltage $V_{S1}$ at which the FET 2 turns off, by the Zener voltage (see FIG. 6C). As a result, when the current $I_D$ flows through the primary winding 2a next time, the FET 22 is maintained in a state in which its operation is completely stopped, and at the same time, the direction of a current to flow toward the secondary winding 2b and the forward direction of the inner parasitic diode 27 are opposite to each other, so that the current does not flow through the secondary winding 2b, thereby positively preventing the generation of a countercurrent.

Further, in the power supply 1b as well, when the FET 14 is switched off, a diode 13 on the side of the primary winding 2a blocks the flow of a current caused by energy accumulated in a capacitor 15, so that generation of a resonance in the primary circuit is prevented. Accordingly, as shown in a right side portion of FIG. 6C, the voltage $V_G'$ output from the secondary winding 1b of the transformer 51 is maintained at a voltage value of approximately 0V during a time period over which the FET 22 should be in an OFF state, whereby it is possible to prevent an abnormal operation of the synchronous rectifier circuit 50 due to the discontinuous current mode. Further, when a current does not flow into the Zener diode 52, the resistance 57 terminates the secondary winding 51b of the autotransformer 51, in other words, the primary winding 51a of the same, by an impedance corresponding to a resistance value of its own.

As described above, according to the power supply 1b, the FET 22 is caused to operate by the control current $I_{22}$ obtained by amplifying the control current $I_{21}$, whereby it is possible to turn on the FET 22 in a very short turn-on time. This makes it possible to prevent an abnormal operation of the synchronous rectifier circuit 50, and switch from a rectifying operation by the inner parasitic diode 27 to a rectifying operation by the FET 22 in a short time period, which results in further enhanced rectifying efficiency.

Figure 7:
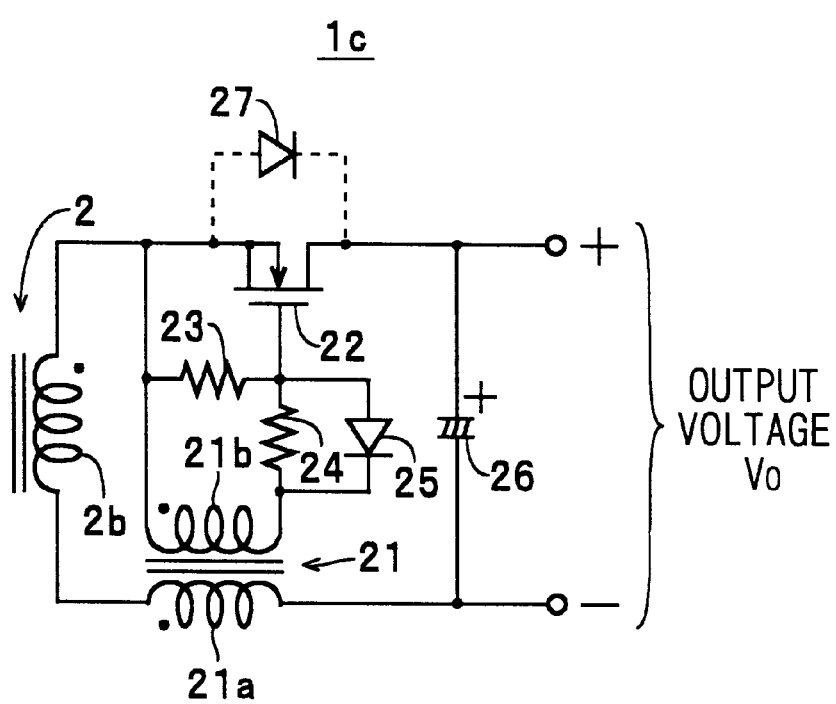
FIG. 7 is a circuit diagram of a power supply 1c according to still another embodiment of the invention.
Figure 8:
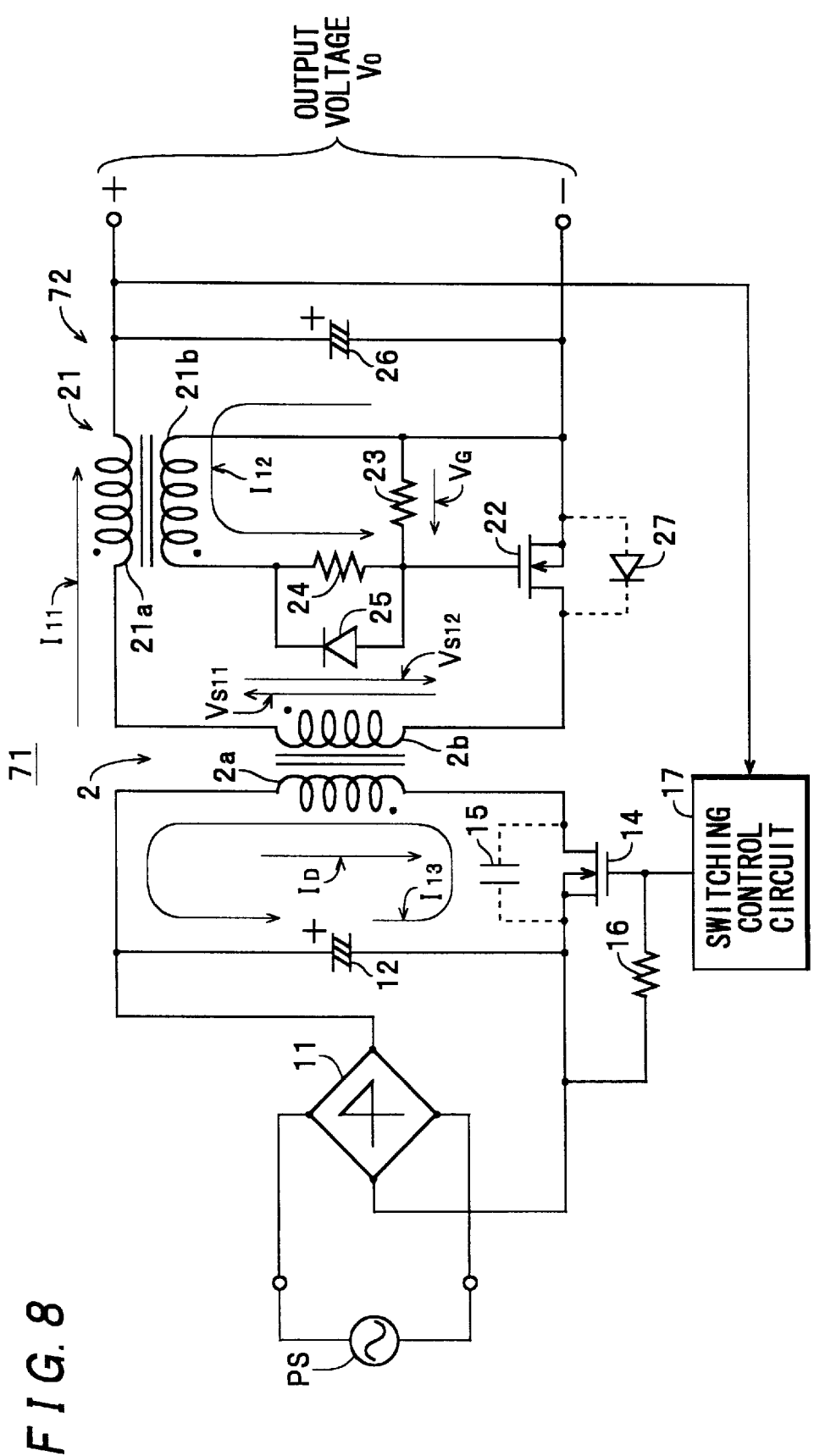
FIG. 8 is a circuit diagram of a power supply 71 of the related art.

Although in the above embodiments, description has been made of an example in which the FET 22 is connected to the low potential side of the secondary winding 2b (or secondary winding 3c) of the transformer 2 (or transformer 3), this is not limitative, but it goes without saying that a variation shown in FIG. 7 is possible in which the FET 22 is connected to an output line side. It should be noted that component parts and elements of a power supply 1c shown in the figure are designated by reference numerals identical to those of corresponding component parts and elements of the power supply 1, and detailed description thereof is omitted. Further, in the synchronous rectifier circuit 20, a transistor or an FET for amplifying the current of a control signal may be connected to an output side of the current transformer 21. Further, although in the above embodiment, description has been made of an example in which the inner parasitic diode 27 of the FET 22 is used, this is not limitative, but it goes without saying that, a diode as a separate member from the FET 22 may be used.

Furthermore, the switching power supply according to the invention can be applied not only to a flyback-type power supply but also to a forward type power supply, a non-insulated chopper type power supply, and a ringing choke type switching power supply. Further, the power supply 1a has no restriction imposed on the voltage of the AC voltage $V_{AC}$, and hence can be applied to a switching power supply and an AC adapter having so-called world-wide input specifications.

Further, although in the above embodiment, description has been made of an example in which the power supply 1a is configured such that the ratio (turn ratio R) of the number Nb of turns of the primary winding 3b to the number Na of turns of the primary winding 3a is set to a value 2 (2:1), this is not limitative, but it is only required that the turn ratio R is equal to or larger than the value 1. In other words, the turn ratio R is only required to be set such that the predetermined voltage V1 determined by the turn ratio R is higher than a threshold voltage $V_S$ which permits the boost (step-up)/buck (step-down) converter 4 to operate. However, to expect sufficient improvement in the input power factor, according to experiments carried out by the present inventor, it is preferred that the turn ratio R is set to a value within a range of 1.5 to 3. If the turn ratio R is in this range, it is confirmed that the input power factor is within a range of 0.85 to 0.9. Accordingly, in comparison with a switching power supply of a capacitor input type whose input power factor is generally 0.5 to 0.65, the power supply 1a has a far higher input power factor. It should be noted that as the turn ratio R is made closer to the value 1, the boost (step-up)/buck (step-down) converter 4 plays a more important role in generating the output voltage $V_O$, and as the turn ratio R is increased, the boost (step-up)/buck (step-down) converter 5 plays a more important role in generating the output voltage $V_O$. Consequently, by defining the turn ratio R to be within the range of 1.5 to 3, the capacitance of the capacitor 23 can be reduced to some degree, whereby the size of the power supply 1a can be minimized.

What is claimed is:

1. A switching power supply comprising:

a transformer having a primary winding and a secondary winding;

a first switching element connected in series with said primary winding of said transformer, for switching an input voltage;

a diode for rectifying an induced voltage induced in said secondary winding of said transformer to generate a rectified current;

control signal-generating means for generating a control signal having a current value or a voltage value approximately proportional to a current value of said rectified current;

a second switching element connected in parallel with said diode in an equivalent fashion and having a control terminal to which said control signal is input, said second switching element operating in response to said control signal, for rectifying said induced voltage; and current-limiting means for preventing flow of a current into said primary winding during an OFF period of said first switching element.

2. A switching power supply according to claim 1, wherein said primary winding of said transformer comprises a first primary winding and a second primary winding, and wherein a pulsating voltage as said input voltage is switched when said pulsating voltage is equal to or higher than a predetermined voltage, to thereby induce said induced voltage in said secondary winding via said first primary winding, and a smoothed DC voltage as said input voltage is switched when said pulsating voltage is lower than said predetermined voltage, to thereby induce said induced voltage in said secondary winding via said second primary winding.

3. A switching power supply according to claim 1, wherein said second switching element is formed by a field effect transistor, and wherein said diode is an inner parasitic diode of said field effect transistor.

4. A switching power supply according to claim 2, wherein said second switching element is formed by a field effect transistor, and wherein said diode is an inner parasitic diode of said field effect transistor.

5. A switching power supply according to claim 1, wherein said current-limiting means is a diode connected in series with said primary winding.

6. A switching power supply according to claim 2, wherein said current-limiting means is a diode connected in series with said primary winding.

7. A switching power supply according to claim 1, including a low potential line, and electric charge release means connected between said control terminal of said second switching element and said low potential line, for releasing an electric charge accumulated in said control terminal when output of said control signal is stopped.

8. A switching power supply according to claim 2, including a low potential line, and electric charge release means connected between said control terminal of said second switching element and said low potential line, for releasing an electric charge accumulated in said control terminal when output of said control signal is stopped.

9. A switching power supply according to claim 1, including an output line for outputting said rectified current, and wherein said control signal-generating means is one of a current transformer and a single-winding transformer each including an input winding inserted in an intermediate portion of said output line, and an output winding capable of outputting said control signal having said current value or said voltage value approximately proportional to said current value of said rectified current flowing through said input winding.

10. A switching power supply according to claim 2, including an output line for outputting said rectified current, and wherein said control signal-generating means is one of a current transformer and a single-winding transformer each including an input winding inserted in an intermediate portion of said output line, and an output winding capable of outputting said control signal having said current value or said voltage value approximately proportional to said current value of said rectified current flowing through said input winding.

11. A switching power supply according to claim 1, including current amplifier means for amplifying a current of said control signal and outputting said amplified current of said control signal to said control terminal of said second switching element.

12. A switching power supply according to claim 2, including current amplifier means for amplifying a current of said control signal and outputting said amplified current of said control signal to said control terminal of said second switching element.

13. A switching power supply according to claim 1, including control signal output control means for stopping output of said control signal to said second switching element when a voltage generated by said control signal-generating means is lower than a predetermined value.

14. A switching power supply according to claim 2, including control signal output control means for stopping output of said control signal to said second switching element when a voltage generated by said control signal-generating means is lower than a predetermined value.

15. A switching power supply according to claim 14, wherein said control signal output control means is a Zener diode connected between said control signal-generating means and said control terminal of said second switching element.

* * * * *